(12) United States Patent
Kim et al.

(10) Patent No.: US 9,175,375 B2
(45) Date of Patent: Nov. 3, 2015

(54) METAL-COATED STEEL SHEET

(75) Inventors: Myung-Soo Kim, Gwangyang-si (KR); Ju-Youn Lee, Gwangyang-si (KR); Young-Ha Kim, Gwangyang-si (KR); Jong-Sang Kim, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 13/880,462

(22) PCT Filed: Oct. 21, 2011

(86) PCT No.: PCT/KR2011/007914
§ 371 (c)(1),
(2), (4) Date: Apr. 19, 2013

(87) PCT Pub. No.: WO2012/053871
PCT Pub. Date: Apr. 26, 2012

(65) Prior Publication Data
US 2013/0209832 A1 Aug. 15, 2013

(30) Foreign Application Priority Data

Oct. 21, 2010 (KR) ........................ 10-2010-0103043

(51) Int. Cl.
*B32B 15/04* (2006.01)
*B32B 15/18* (2006.01)
(Continued)

(52) U.S. Cl.
CPC .................. *C23C 2/04* (2013.01); *B32B 15/043* (2013.01); *C09D 1/00* (2013.01); *C23C 2/02* (2013.01);
(Continued)

(58) Field of Classification Search
CPC .... B32B 15/013; B32B 15/04; B32B 15/043;
B32B 15/18; C23C 2/02; C23C 2/04; C23C 2/06; C23C 30/00; C23C 30/005; Y10T 428/273; Y10T 428/12799; Y10T 428/12792; Y10T 428/12611; Y10T 428/12618; Y10T 428/1259; Y10T 428/12708; Y10T 428/12722; Y10T 428/12903; Y10T 428/1291; Y10T 428/12917; Y10T 428/12924; Y10T 428/12944; Y10T 428/12972; Y10T 428/12979
USPC ......... 428/658, 659, 341, 469, 632, 633, 639, 428/640, 646, 648, 678, 679, 680, 682, 684, 428/685
See application file for complete search history.

(56) References Cited

U.S. PATENT DOCUMENTS 4,859,291 A * 8/1989 Takada et al. ................. 205/272
5,447,802 A * 9/1995 Tobiyama et al. ............ 428/610
(Continued)

FOREIGN PATENT DOCUMENTS

| CN | 1129017 A | 8/1996 |
| CN | 1995458 A | 7/2007 |

(Continued)

OTHER PUBLICATIONS

Machine Translation, Miyoshi et al., JP 2004-209787, Jul. 2004.*
(Continued)

*Primary Examiner* — Michael E La Villa
(74) *Attorney, Agent, or Firm* — The Webb Law Firm

(57) ABSTRACT

Provided is a metal coated steel sheet having a coating layer including a metal having a level of Gibbs free energy equal to that of Fe or above and an oxide thereof. Accordingly, the quality of a plated steel sheet may be improved by preventing the generation of bare spots through inhibition of the formation of Mn oxide, Si oxide, or Al oxide on the surface thereof, and simultaneously, the complexity of a manufacturing facility or an increase in manufacturing costs may be minimized. Economic benefits are thus realized.

2 Claims, 4 Drawing Sheets

(51) Int. Cl.
*C23C 2/04* (2006.01)
*C23C 30/00* (2006.01)
*C23C 2/02* (2006.01)
*C23C 2/06* (2006.01)
*C09D 1/00* (2006.01)

(52) U.S. Cl.
CPC . *C23C 2/06* (2013.01); *C23C 30/00* (2013.01); *C23C 30/005* (2013.01); *Y10T 428/1259* (2015.01); *Y10T 428/1291* (2015.01); *Y10T 428/12611* (2015.01); *Y10T 428/12618* (2015.01); *Y10T 428/12708* (2015.01); *Y10T 428/12722* (2015.01); *Y10T 428/12799* (2015.01); *Y10T 428/12903* (2015.01); *Y10T 428/12917* (2015.01); *Y10T 428/12924* (2015.01); *Y10T 428/12944* (2015.01); *Y10T 428/12972* (2015.01); *Y10T 428/12979* (2015.01); *Y10T 428/273* (2015.01)

(56) References Cited

U.S. PATENT DOCUMENTS

| | | | |
|---|---|---|---|
| 5,861,218 A | | 1/1999 | Sakurai et al. |
| 2008/0283154 A1* | | 11/2008 | Taniguchi et al. ............ 148/240 |
| 2011/0217569 A1 | | 9/2011 | Fushiwaki et al. |
| 2012/0125491 A1* | | 5/2012 | Meurer et al. ................ 148/533 |

FOREIGN PATENT DOCUMENTS

| | | | |
|---|---|---|---|
| JP | 63-266093 | | 11/1988 |
| JP | 63-270492 A | | 11/1988 |
| JP | 01-119651 | | 5/1989 |
| JP | 08188861 A | | 7/1996 |
| JP | 10259468 A | | 9/1998 |
| JP | 2002-117779 | | 4/2002 |
| JP | 2003-033802 A | | 2/2003 |
| JP | 2004-083923 | | 3/2004 |
| JP | 2004209787 A | | 7/2004 |
| JP | 2005200690 A | | 7/2005 |
| JP | 2008-248229 | | 10/2008 |
| JP | 2010126758 A | | 6/2010 |
| WO | WO 2010/122097 | * | 10/2010 |

OTHER PUBLICATIONS

Kanbe, Tokuzo, "NP series Electroless Plating", Maki Bookstore Sep. 30, 1990, the fourth impression of the first edition, p. 13-14.

* cited by examiner

METAL-COATED STEEL SHEET

TECHNICAL FIELD

The present invention relates to a metal coated steel sheet, a hot-dip galvanized steel sheet, and manufacturing methods thereof, and more particularly, to a metal coated steel sheet having excellent surface qualities which includes a metal coating layer including a metal having a level of Gibbs free energy equal to that of iron (Fe) or above, and an oxide thereof in a base steel sheet, a hot-dip galvanized steel sheet, and manufacturing methods thereof.

BACKGROUND ART

Hot-dip galvanized steel sheets have been widely used in automobiles, building materials, various structures, and household appliances due to having excellent corrosion resistance properties, and in particular, the high strengthening of steel sheets has been continuously undertaken in line with recent demands for weight reductions in vehicles. However, since the ductility of steel sheets relatively decreases when the strength thereof is increased, high-strength steels having improved ductility, such as dual phase (DP) steels having manganese (Mn), silicon (Si), or aluminum (Al) added to a base steel sheet, complex phase (CP) steels, and transformation induced plasticity (TRIP) steels, have been manufactured.

However, Mn, Si, or Al, added to steel sheets, may react with a trace of oxygen existed in an annealing furnace to form a single or complex oxide of Si, Mn, or Al, and thus, bare spots may be generated to degrade surface qualities of the plated steel sheet.

As a typical method for addressing the foregoing limitations, Japanese Patent Application Laid-Open Publication No. 2005-200690 discloses a technique in which a base steel sheet is coated with metal, such as nickel (Ni), after annealing and cooling to cover Mn oxide, Si oxide, or Al oxide formed on a surface thereof during annealing with the metal coating layer. In general, a continuous hot-dip galvanizing process is integrally configured in order to maintain a reducing atmosphere from an annealing process to a galvanizing process. However, with respect to the above technique, the annealing and galvanizing processes must be separated in order to allow for an annealing process before the metal coating process, and thus, a manufacturing facility may be complicated and manufacturing costs may be increased.

As another typical method for addressing the foregoing limitations, there is provided a technique, in which metal coating is performed in advance, and annealing and plating are subsequently performed. However, in the case that a temperature of 750° C. or above is used during annealing, the coated metallic materials may be diffused into a base steel sheet to this dissipate or thin a metal coating layer, and thus, there may be limitations in substantially preventing the surface diffusion of Mn, Si, or Al.

Therefore, the need for a economical technique, allowing for the surface qualities of a plated steel sheet to be improved by preventing the generation of bare spots through the inhibition of the formation of Mn oxide, Si oxide, or Al oxide on the surface of the steel sheet, has rapidly increased.

SUMMARY OF THE INVENTION

An aspect of the present invention provides a metal coated steel sheet, a hot-dip galvanized steel sheet, and manufacturing methods thereof which may minimize complexity of a manufacturing facility or an increase in manufacturing costs while improving quality of the galvanized steel sheet by preventing the formation of an oxide of Mn, Si, or Al on the surface thereof.

According to an aspect of the present invention, there is provided a metal coated steel sheet having a coating layer including a metal having a level of Gibbs free energy equal to that of iron (Fe) or above and an oxide of the metal.

The coating layer may be included in a metal amount ranging from 0.1 g/m$^2$ to 3 g/m$^2$, based on an equivalent amount of the metal and the oxide of the metal.

Also, the oxide of the metal may be included in a metal amount ranging from 0.5 wt % to 5 wt % based on an equivalent amount of oxygen.

Furthermore, the steel sheet may include one or more selected from the group consisting of silicon (Si), manganese (Mn), and aluminum (Al) in an amount of 0.2 wt % or above, and may further include one or more selected from the group consisting of titanium (Ti), boron (B), and chromium (Cr) in an amount of 0.01 wt % or above.

The metal may be one or more selected from the group consisting of nickel (Ni), Fe, cobalt (Co), copper (Cu), tin (Sn), and antimony (Sb).

According to another aspect of the present invention, there is provided a hot-dip galvanized steel sheet characterized in that on a glow discharge spectrometer (GDS) graph of the hot-dip galvanized steel sheet sequentially including a base steel sheet, a coating layer of a metal having a level of Gibbs free energy equal to that of Fe or above, and a hot-dip galvanized layer, a peak of the metal is disposed closer to the hot-dip galvanized layer than a peak of oxygen.

A content of oxygen at the peak of oxygen may be in a range of 0.05 wt % to 1 wt %.

Also, the steel sheet may include one or more selected from the group consisting of Si, Mn, and Al in an amount of 0.2 wt % or above, and may further include one or more selected from the group consisting of Ti, B, and Cr in an amount of 0.01 wt % or above.

The metal may be one or more selected from the group consisting of Ni, Fe, Co, Cu, Sn, and Sb.

According to another aspect of the present invention, there is provided a method of manufacturing a metal coated steel sheet characterized in that a surface of a base steel sheet is coated with a solution in which a molar concentration of $SO_4^{2-}$ is equal to 0.7 times to 1.2 times a molar concentration of $Ni^{2+}$, a concentration of $Ni^{2+}$ is in a range of 20 g/L to 90 g/L, and a concentration of $Ni(OH)_2$ is 1 g/L or less, based on an equivalent amount of Ni.

A pH level of the solution may be in a range of 4 to 6.

Also, the steel sheet may include one or more selected from the group consisting of Si, Mn, and Al in an amount of 0.2 wt % or above, and may further include one or more selected from the group consisting of Ti, B, and Cr in an amount of 0.01 wt % or above.

According to another aspect of the present invention, there is provided a method of manufacturing a hot-dip galvanized steel sheet including: coating a surface of a base steel sheet with a solution in which a molar concentration of $SO_4^{2-}$ is equal to 0.7 times to 1.2 times a molar concentration of $Ni^{2+}$, a concentration of $Ni^{2+}$ is in a range of 20 g/L to 90 g/L, and a concentration of $Ni(OH)_2$ is 1 g/L or less, based on an equivalent amount of Ni; heating the coated steel sheet; cooling the heated steel sheet; and hot-dip galvanizing the annealed steel sheet.

A pH level of the solution may be in a range of 4 to 6.

Also, the heating may be performed at a temperature ranging from 750° C. to 900° C.

Furthermore, the hot-dip galvanizing may be performed in a plating bath having a temperature ranging from 440° C. to 480° C.

Also, the steel sheet may include one or more selected from the group consisting of Si, Mn, and Al in an amount of 0.2 wt % or above, and may further include one or more selected from the group consisting of Ti, B, and Cr in an amount of 0.01 wt % or above.

The method may further include performing an alloying heat treatment on the hot-dip galvanized steel sheet at a temperature ranging from 480° C. to 600° C., after the hot-dip galvanizing.

According to an aspect of the present invention, quality of a plated steel sheet may be improved by preventing the generation of bare spots through inhibition of the formation of a Mn oxide, a Si oxide, or an Al oxide on the surface thereof, and simultaneously, complexity of a manufacturing facility or an increase in manufacturing costs may be minimized. Thus, the present invention may be highly economically advantageous.

DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Hereinafter, a metal coated steel sheet of the present invention will be described in detail.

The present inventors recognized limitations in a typical technique for inhibiting the formation of oxide of Mn, Si, or Al on the surface of a steel sheet by coating and annealing a metal having a level of Gibbs free energy equal to that of iron (Fe) or above, such as nickel (Ni), and then galvanizing, and found that, in the case in which the metal having a level of Gibbs free energy equal to that of Fe or above as well as an oxide (including hydroxide) thereof is included, surface diffusion of Mn, Si, or Al is inhibited by the metal oxide, thereby leading to the invention of a metal coated steel sheet characterized by having a coating layer including the metal having a level of Gibbs free energy equal to that of Fe or above and the oxide of the metal.

In the present invention, the phrase "the metal having a level of Gibbs free energy equal to that of Fe or above" denotes that a change in Gibbs free energy per one mole of oxygen during an oxidation reaction of a metal equal to that of iron (Fe) or above.

Figure 1A:
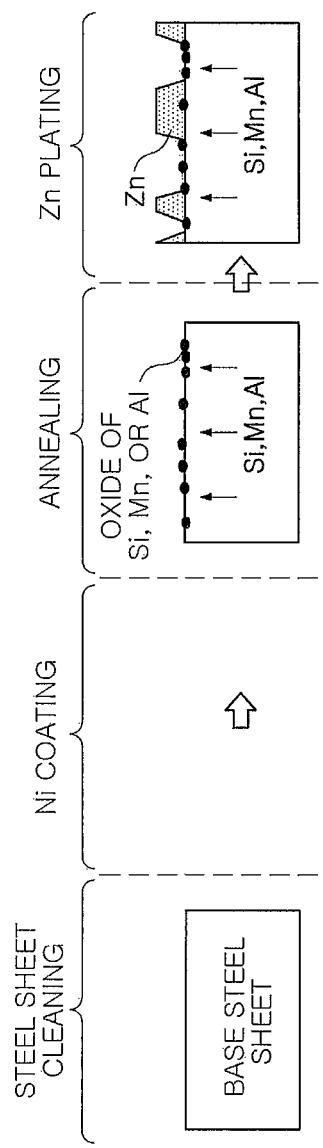
FIG. 1(a) is a schematic view illustrating a structure of a steel sheet according to a manufacturing process of a comparative example not having a nickel (Ni) coating.
Figure 1B:
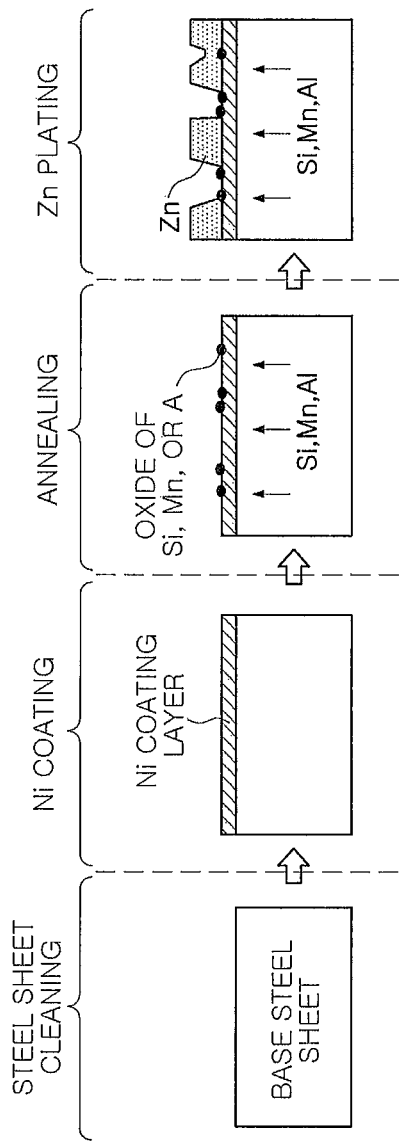
FIG. 1(b) is a schematic view illustrating a structure of a steel sheet according to a manufacturing process of a comparative example having Ni coating but not including Ni oxides (including hydroxide)
Figure 1C:
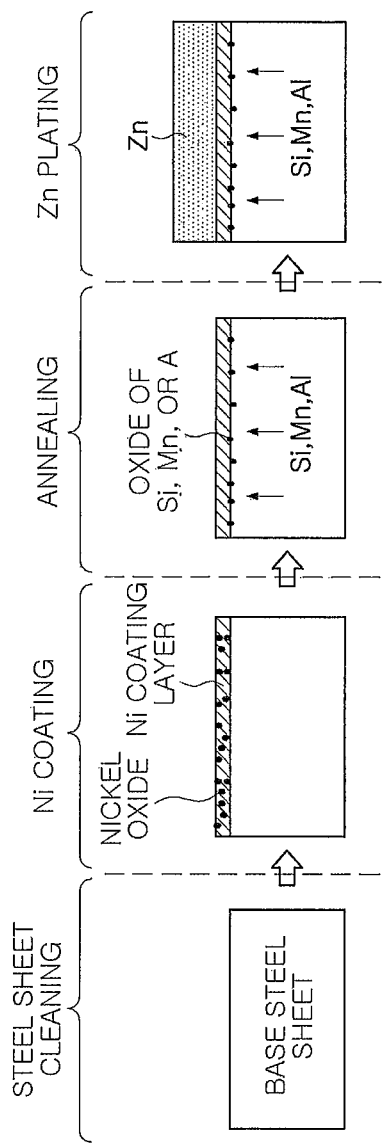
FIG. 1(c) is a schematic view illustrating a structure of a steel sheet according to a manufacturing process of the present invention.

When a principle of inhibiting the formation of the oxide of Mn, Si, or Al on the surface of a steel sheet is described using Ni as an example of the metal having a level of Gibbs free energy equal to that of Fe or above with reference to FIG. 1, it may be understood that, with respect to FIG. 1(a), Ni coating is not performed before galvanizing and a large amount of Mn oxide, Si oxide, or Al oxide is formed on the surface of a steel sheet during annealing to thus significantly generate bare spots, and, with respect to FIG. 1(b), Ni coating is performed before galvanizing, but there may still remain limitations in inhibiting the formation of the oxide of Mn, Si, or Al on the surface of a Ni coating layer. With respect to FIG. 1(c), it is in accordance with an example of the present invention in which Ni coating is performed before galvanizing and Ni oxides (including hydroxide) is also included in a coating layer, wherein Mn, Si, or Al may be in contact with NiO to form MnO, $SiO_2$, or $Al_2O_3$, NiO may be reduced to precipitate as Ni, and thus, Mn, Si, or Al may not form an oxide by being diffused into the surface of the metal coating layer but Mn oxide, Si oxide, or Al oxide may be disposed on a lower portion of the metal coating layer or an upper portion of a base steel sheet.

The metal having a level of Gibbs free energy equal to that of Fe or above may be one or more selected from the group consisting of Ni, Fe, cobalt (Co), copper (Cu), tin (Sn), and antimony (Sb), and the reason for using these metals is that the above substitution reaction may be facilitated because a level of Gibbs free energy required for the oxidation of Mn, Si, or Al is much lower than levels of Gibbs free energy required for the oxidation of the above metals.

The metal and an oxide thereof may be included in an amount ranging from 0.1 $g/m^2$ to 3 $g/m^2$ based on an equivalent amount of the metal. In the case that the equivalent amount is less than 0.1 $g/m^2$, uncoated portions may occur because an amount of the coated metal is relatively small, and an upper limit thereof may be 3 $g/m^2$ in consideration of economic factors.

Also, the oxide of the metal acts to form oxides, such as MnO, $SiO_2$, or $Al_2O_3$, before Mn, Si, or Al diffuses into the surface of the metal coating layer, and the oxide of the metal may be included in an amount ranging from 0.5 wt % to 5 wt % based on an equivalent amount of oxygen. In the case that the equivalent amount of oxygen is less than 0.5 wt %, it may not be sufficient to oxidize Mn, Si, or Al before Mn, Si, or Al diffuses into the surface thereof, and in the case in which the equivalent amount is greater than 5 wt %, the amount of the oxide other than the metal may significantly increase to thus decrease adhesion between the metal coating layer and the base steel sheet.

Furthermore, the steel sheet may include one or more selected from the group consisting of Si, Mn, and Al in an amount of 0.2 wt % or above and may further include one or more selected from the group consisting of titanium (Ti), boron (B), and chromium (Cr) in an amount of 0.01 wt % or above. Since the present invention is aimed at preventing the surface diffusion of Si, Mn, or Al included in the base steel sheet and the formation of the oxide of the metal, the effects of the present invention may be maximized in the case that Si, Mn, or Al is included in an amount of 0.2 wt % or above in the base steel sheet. Also, since Ti, B, and Cr components may form concentrated products on the surface of the steel sheet, effects of the present invention may be suitable for maximizing the effects in the case in which Ti, B, or Cr is included in an amount of 0.01 wt % or above.

Hereinafter, a hot-dip galvanizing steel sheet of the present invention will be described in detail.

According to another aspect of the present invention, there is provided a hot-dip galvanized steel sheet characterized in that on a glow discharge spectrometer (GDS) graph of the hot-dip galvanized steel sheet sequentially including a base steel sheet, a coating layer of a metal having a level of Gibbs free energy equal to that of Fe or above, and a hot-dip galvanized layer, a peak of the metal is disposed closer to the hot-dip galvanized layer than a peak of oxygen, and the metal may be one or more selected from the group consisting of Ni, Fe, Co, Cu, Sn, and Sb.

Figure 2:
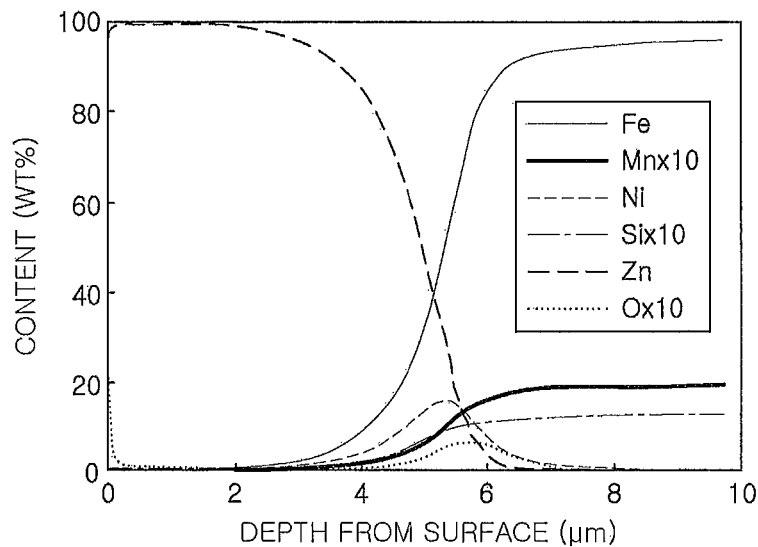
FIG. 2 is a graph illustrating the results of glow discharge spectrometer (GDS) analysis of a hot-dip galvanized steel sheet according to an example of the present invention.
Figure 3:
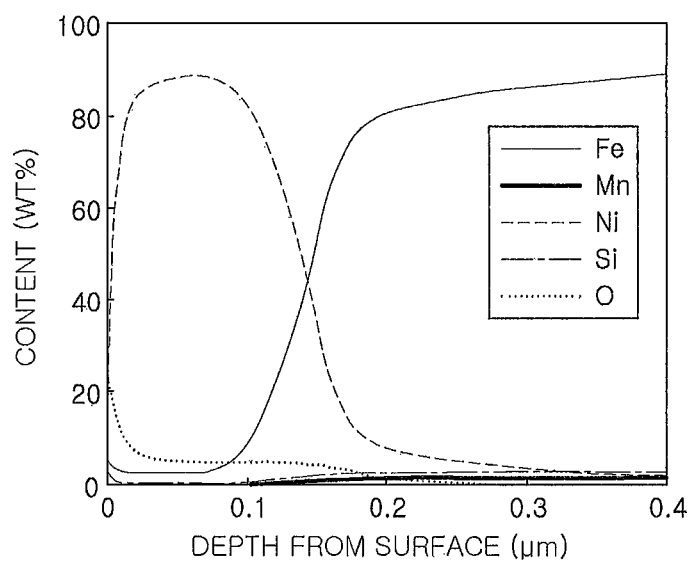
FIG. 3 is a graph illustrating the results of GDS analysis of a metal coated steel sheet according to an example of the present invention.

Referring to FIG. 2, since the hot-dip galvanized steel sheet is formed after the metal coating and annealing, a substitution reaction of Mn, Si, or Al with an oxide of the metal having a level of Gibbs free energy equal to that of Fe or above, such as NiO, occurs before Mn, Si, or Al diffuses into the surface of a metal coating layer, and thus, the oxide may be disposed on the lower portion of the metal coating layer or the upper portion of the base steel sheet. Thus, oxygen included in the oxide is disposed relatively closer to the base steel sheet and is disposed relatively farther from the hot-dip galvanized layer in comparison to Ni on the GDS graph. Therefore, that the peak of the metal is disposed closer to the hot-dip galvanized layer than the peak of oxygen on the GDS graph may be interpreted as improving platability by preventing the surface diffusion of Mn, Si, or Al and the formation of the oxide of the metal on the surface of the metal coating layer by the metal oxide.

A content of oxygen at the peak of oxygen may be in a range of 0.05 wt % to 1 wt %. The content of oxygen at the peak of oxygen denotes a content at a peak of oxygen included in MnO, $SiO_2$, or $Al_2O_3$ after the reaction and may be deduced from oxygen included in the nickel oxide remaining in the metal coating layer before the reaction. That is, the content of oxygen is decreased as the metal oxide contained in the initial metal coating layer is reduced to metal by reduction annealing. In the case that the content thereof is about 0.05 wt % or above at a peak position, the formation of Mn oxide, Si oxide, or Al oxide on the surface of the metal coating layer may be inhibited, and in the case in which the content thereof increases to exceed about 1 wt %, adhesion between the coating layer and the base steel sheet may be reduced.

Also, the steel sheet may include one or more selected from the group consisting of Si, Mn, and Al in an amount of 0.2 wt % or above, and may further include one or more selected from the group consisting of Ti, B, and Cr in an amount of 0.01 wt % or above.

Hereinafter, a method of manufacturing a metal coated steel sheet of the present invention will be described in detail. The present invention provides a method of manufacturing a metal coated steel sheet characterized in that a surface of a base steel sheet is coated with a solution in which a molar concentration of $SO_4^{2-}$ is equal to 0.7 times to 1.2 times a molar concentration of $Ni^{2+}$, a concentration of $Ni^{2+}$ is in a range of 20 g/L to 90 g/L, and a concentration of $Ni(OH)_2$ is 1 g/L or less, based on an equivalent amount of Ni.

First, a molar concentration ratio between $SO_4^{2-}$ ions and $Ni^{2+}$ ions plays an important role in a reaction of forming hydroxide at an interface during a coating reaction, in which the molar concentration of $SO_4^{2-}$ may be equal to 0.7 times to 1.2 times the molar concentration of $Ni^{2+}$. Since $SO_4^{2-}$ ions and $Ni^{2+}$ ions form a weak complex compound in a solution, adhesion between the $SO_4^{2-}$ ions and the $Ni^{2+}$ ions may be relatively strong in the case that an amount of the $SO_4^{2-}$ ions is relatively larger than that of the $Ni^{2+}$ ions, and thus, a reaction of forming nickel hydroxide by the reaction of $Ni^{2+}$ ions with $OH^-$ ions during an interfacial reaction between the solution and the steel sheet may be inhibited. Therefore, the molar concentration of $SO_4^{2-}$ may be controlled to be equal to 1.2 times or less the molar concentration of $Ni^{2+}$. Also, in the case in which the amount of the $SO_4^{2-}$ ions is relatively smaller than that of the $Ni^{2+}$ ions, the reaction of forming nickel hydroxide during the interfacial reaction may be relatively promoted, and thus, the reaction of reducing $Ni^{2+}$ ions to Ni may be inhibited to significantly increase nickel oxide in the metal coating layer. Therefore, the molar concentration of $SO_4^{2-}$ may be controlled to be equal to 0.7 times the molar concentration of $Ni^{2+}$ or above.

Furthermore, the concentration of $Ni^{2+}$ ions included in the metal coating solution may be in a range of 20 g/L to 90 g/L. In the case that the concentration of $Ni^{2+}$ ions in the solution is less than 20 g/L, an appropriate amount of Ni in the metal coating layer may not be secured due to a low coating efficiency, and in the case that the concentration of $Ni^{2+}$ ions in the solution is greater than 90 g/L, a nickel salt may precipitate according to microscopic changes in the temperature of the coating solution.

Also, the concentration of $Ni(OH)_2$ may be 1 g/L or less, based on an equivalent amount of Ni. $Ni(OH)_2$ may not be included in the coating solution. However, in the case in which $Ni(OH)_2$ is included in the solution, it may be advantageous in securing the metal oxide in the metal coating layer. However, in the case that the concentration of $Ni(OH)_2$ is greater than 1 g/L based on the equivalent amount of Ni, the coating solution becomes turbid to increase an amount of a sludge generated, and thus, an upper limit thereof may be controlled to be 1 g/L based on the equivalent amount of Ni.

In addition, a pH level of the coating solution plays a very important role in co-depositing the metal oxide in the coating layer. That is, a reduction reaction (reaction generating hydrogen gas) of $H^+$ ions as well as a reduction reaction of $Ni^{2+}$ ions may also occur at an interface between the steel sheet as an anode and the solution during a metal coating process, wherein an increase in the pH thereof may instantaneously occur at the interface by the reduction reaction of $H^+$ ions to change a portion of $Ni^{2+}$ ions into nickel hydroxide and thus, co-deposition of the nickel hydroxide may occur in the metal coating layer. Therefore, in the case that the pH level of the pre-plating solution is relatively low, the generation of the nickel hydroxide is prevented, and in the case in which the pH thereof is relatively high, a relatively large amount of the nickel oxide may be co-deposited. Therefore, the pH thereof may be limited to be within a range of 4 to 6 for the co-deposition of an appropriate amount of the nickel oxide.

Also, the steel sheet may include one or more selected from the group consisting of Si, Mn, and Al in an amount of 0.2 wt % or above and may further include one or more selected from the group consisting of Ti, B, and Cr in an amount of 0.01 wt % or above.

Meanwhile, the present invention provides a method of manufacturing a hot-dip galvanized steel sheet including: coating a surface of a base steel sheet with a solution in which a molar concentration of $SO_4^{2-}$ is equal to 0.7 times to 1.2 times a molar concentration of $Ni^{2+}$, a concentration of $Ni^{2+}$ is in a range of 20 g/L to 90 g/L, and a concentration of $Ni(OH)_2$ is 1 g/L or less, based on an equivalent amount of Ni; heating the coated steel sheet; cooling the heated steel sheet; and hot-dip galvanizing the annealed steel sheet. A pH level of the solution may be in a range of 4 to 6.

In the case that the coating is performed with the solution, since nickel and nickel oxide are appropriately included in the metal coating layer, oxides may be formed before Mn, Si, or Al diffuses into the surface of the metal coating layer even if heating (annealing) is performed thereafter, and thus, generation of bare spots due to the formation of the oxide of Mn, Si, or Al on the surface thereof may be prevented. Therefore, in the case that cooling and galvanizing are performed thereafter, excellent platability may be secured to thus improve surface qualities of the galvanized steel sheet.

Furthermore, the heating may be performed at a temperature ranging from 750° C. to 900° C. In the case that the temperature during annealing is greater than 900° C., since diffusion rate of Mn, Si, or Al may increase and a large amount of Ni oxides may be reduced to Ni, remaining Ni oxide may be less, and thus, the surface diffusion of Mn, Si, or Al may not be effectively inhibited. In the case that the temperature is less than 750° C., the annealing may not be sufficiently performed and thus, excellent material characteristics may not be secured.

The hot-dip galvanizing may be performed in a plating bath having a temperature ranging from 440° C. to 480° C. In the case that the temperature of the plating bath is less than 440° C., since viscosity of the plating bath may decrease, the driving of rollers in the plating bath may be difficult, and thus, scratches may occur in the steel sheet due to the occurrence of slippage. In the case that the temperature of the plating bath is greater than 480° C., an amount of evaporated zinc (Zn) may increase and thus, a manufacturing facility may be contaminated or Zn may be adhered to the steel sheet to cause defects.

Also, the steel sheet may include one or more selected from the group consisting of Si, Mn, and Al in an amount of 0.2 wt % or above and may further include one or more selected from the group consisting of Ti, B, and Cr in an amount of 0.01 wt % or above.

Performing an alloying heat treatment on the hot-dip galvanized steel sheet at a temperature ranging from 480° C. to 600° C. may be further included after the hot-dip galvanizing. A content of Fe in the coating layer may be sufficiently secured by controlling the alloying heat treatment temperature to be 480° C. or above. The temperature is controlled to be 600° C. or less and thus, a powdering phenomenon, in which the coating layer is detached during processing due to the relatively high content of Fe, may be appropriately prevented.

Hereinafter, the present invention will be described in detail, according to specific examples. However, the following examples are merely provided to allow for a clearer understanding of the present invention, rather than to limit the scope thereof.

EXAMPLES

There are no limitations in steels in which the effects of the present invention are implemented. However, since a main object of the present invention is to prevent the formation of the oxide of Mn, Si, or Al on the surface of a metal coating layer, steel including Mn, Si, or Al in an amount of 0.2 wt % or above may be used for maximizing the effects. In the present experiments, a 1.2 mm thick cold-rolled transformation induced plasticity (TRIP) steel sheet including 1.0 wt % of Si, 1.6 wt % of Mn, and 0.03 wt % of Al was used as a base steel sheet.

Ni coating was performed on the steel sheet and the compositions of Ni coating solutions are presented in Table 1. Coating weights of Ni coating layers were measured by analyzing contents of Ni through inductively coupled plasma (ICP) after dissolving the coating layers, and contents of Ni oxides in the coating layers were measured by quantitatively analyzing an oxygen component contained in each Ni coating layer by measuring distribution of each component in a thickness direction of each steel sheet from an interface to a base steel sheet with a glow discharge spectrometer (GDS). The interface between the Ni coating layer and the base steel sheet was determined as a point where an amount of a coating material and an amount of base steel intersected each other in a GDS graph.

Samples after the Ni coating were reduction annealed at annealing temperatures presented in Table 1 for 60 seconds and then cooled to 400° C. Thereafter, over aging was performed at 400° C. for 120 seconds and the samples were then heated to 480° C. Then, the samples were plated by dipping in a galvanizing bath having an effective Al concentration of 0.2% for 5 seconds and coating weight was adjusted to 60 g/m² based on one side thereof through air wiping. A temperature of the galvanizing bath was 460° C.

TABLE 1

| Category | $Ni^{2+}$ (g/L) | $Ni(OH)_2$ (Ni equivalent weight, g/l) | Molar concentration ratio ($Ni^{2+}$ moles/ $SO_4^{2-}$ moles) | pH | Annealing temperature (° C.) |
|---|---|---|---|---|---|
| Inventive Example 1 | 30 | 0 | 0.8 | 5.9 | 800 |
| Inventive Example 2 | 40 | 0.2 | 0.7 | 5 | 800 |
| Inventive Example 3 | 40 | 0.5 | 1 | 5 | 800 |
| Inventive Example 4 | 50 | 0.9 | 1.2 | 4.2 | 800 |
| Inventive Example 5 | 50 | 0 | 0.8 | 4.8 | 780 |
| Inventive Example 6 | 50 | 0.6 | 1 | 4.4 | 800 |
| Inventive Example 7 | 50 | 0.1 | 0.8 | 5.5 | 840 |
| Inventive Example 8 | 90 | 0 | 0.7 | 5.8 | 860 |
| Inventive Example 9 | 90 | 0.5 | 1.2 | 5.8 | 820 |
| Inventive Example 10 | 90 | 1 | 1.2 | 5.9 | 820 |
| Comparative Example 1 | — | — | — | — | 820 |
| Comparative Example 2 | 30 | 0 | 0.5 | 5.5 | 800 |
| Comparative Example 3 | 50 | 0.2 | 1.5 | 5.3 | 780 |
| Comparative Example 4 | 50 | 0.5 | 0.8 | 6.6 | 800 |
| Comparative Example 5 | 70 | 0.5 | 0.9 | 3.3 | 800 |
| Comparative Example 6 | 50 | 0.5 | 0.5 | 3.1 | 800 |
| Comparative Example 7 | 50 | 0.9 | 1.7 | 6.6 | 800 |

Surfaces of hot-dip galvanized steel sheets having the plating completed were visually examined and surface qualities were evaluated according to the presence and degree of bare spots. Oxides contained in the interfaces between the pre-plated layers and the base steel sheets were analyzed by using a transmission electron microscope (TEM) to confirm whether the oxides were Si oxide, Mn oxide, Al oxide, and/or complex oxides of Si, Mn, and Al. Also, maximum contents of oxygen at the interfaces between the Ni coating layers and the base steel sheets were measured by analyzing components in a depth direction from the surfaces of the coating layers to the base steel sheets with GDS and the results thereof are presented in Table 2.

TABLE 2

| Category | Ni coating layer | | Galvanized steel sheet | |
|---|---|---|---|---|
| | Coating weight (equivalent weight of Ni, $g/m^2$) | Ni oxides content (equivalent weight of O, wt %) | Maximum oxide content (equivalent weight of O, wt %) | Surface qualities |
| Inventive Example 1 | 0.1 | 0.6 | 0.07 | ○ |
| Inventive Example 2 | 0.5 | 0.8 | 0.11 | ○ |
| Inventive Example 3 | 0.8 | 1.9 | 0.25 | ⊚ |
| Inventive Example 4 | 1.0 | 3.8 | 0.47 | ⊚ |
| Inventive Example 5 | 1.0 | 1.9 | 0.25 | ⊚ |
| Inventive Example 6 | 1.0 | 2.7 | 0.36 | ⊚ |
| Inventive Example 7 | 1.0 | 1.5 | 0.22 | ⊚ |
| Inventive Example 8 | 2.5 | 0.7 | 0.14 | ⊚ |
| Inventive Example 9 | 0.5 | 4.1 | 0.59 | ⊚ |
| Inventive Example 10 | 0.5 | 4.6 | 0.68 | ⊚ |
| Comparative Example 1 | — | — | — | X |
| Comparative Example 2 | 0.3 | 0.1 | 0 | X |
| Comparative Example 3 | 0.5 | 7.6 | 0.1 | Δ |
| Comparative Example 4 | 0.5 | 6.5 | 0.1 | Δ |
| Comparative Example 5 | 0.5 | 0.2 | 0 | X |
| Comparative Example 6 | 0.5 | 0.1 | 0 | X |
| Comparative Example 7 | 1 | 8.5 | 0.3 | Δ |

Surface qualities: ⊚ (very good, steel sheet having no bare spot over the entire plated steel sheet), ○ (good, steel sheet in which a small number of point-shaped bare spots having a diameter of less than 0.5 mm were observed), Δ (poor, steel sheet in which a large number of point-shaped bare spots having a diameter ranging from 0.5 mm to 2 mm were observed), and X (very poor, steel sheet in which bare spots having a diameter greater than 2 mm were observed).

As illustrated in Tables 1 and 2, with respect to Inventive Examples 1 to 10 in accordance with the present invention, Ni coating was performed by using solutions in which a concentration of $Ni^{2+}$ ions in the coating solution were in a range of 20 g/L to 90 g/L, a concentration of $Ni(OH)_2$ was in a range of 0 g/L to 1 g/L based on an equivalent amount of Ni, a pH thereof was in a range of 4 to 6, and a molar concentration of $SO_4^{2-}$ was equal to 0.7 times to 1.2 times a molar concentration of $Ni^{2+}$. As a result, coating weights of Ni corresponded to a range of 0.1 $g/m^2$ to 3 $g/m^2$, amounts of Ni oxides (including hydroxide) corresponded to a range of 0.5 wt % to 5 wt %, and contents of oxygen at oxygen peaks satisfied a range of 0.01% to 1%. Therefore, surface qualities of the samples were good to very good and thus, it may be confirmed that the formation of oxide of Mn, Si, or Al on the surface of the coating layers was well prevented.

However, since Ni coating itself was not performed with respect to Comparative Example 1, Ni and an Ni oxides were not included. As a result, the surface diffusion of Mn, Si, or Al was not prevented and thus, surface qualities were very poor.

With respect to Comparative Example 2, since the molar concentration of $SO_4^{2-}$ was equal to 0.5 times the molar concentration of $Ni^{2+}$ which was less than 0.7 times, the formation of Ni oxides was prevented, and thus, the formation of oxide of Mn, Si, or Al on the surface of the coating layer was not effectively prevented. Therefore, a large number of bare spots were observed and surface qualities were very poor.

In contrast, with respect to Comparative Example 3, since the molar concentration ratio was too high, a relatively large amount of Ni oxides was formed, and thus, adhesion between the coating layer and the base steel sheet was not good. It may be confirmed that surface qualities were poor because the metal coating layer was partially detached by a roll.

Also, with respect to Comparative Example 4, since the pH was relatively high, a relatively large amount of Ni oxides was formed, and thus, poor surface qualities were obtained as in Comparative Example 3.

With respect to Comparative Example 5, since the pH was relatively low, the formation of Ni oxides was prevented, and it may be confirmed that very poor surface qualities were obtained as in Comparative Example 2.

Furthermore, with respect to Comparative Example 6, since both molar concentration ratio and pH were low, the formation of Ni oxides was highly prevented, and thus, surface qualities were very poor.

Finally, with respect to Comparative Example 7, since both molar concentration ratio and pH were high, a relatively large amount of Ni oxides was formed, and thus, poor surface qualities were obtained.

While the present invention has been shown and described in connection with the exemplary embodiments, it will be apparent to those skilled in the art that modifications and variations can be made without departing from the spirit and scope of the invention as defined by the appended claims.

The invention claimed is:

1. A hot-dip galvanized steel sheet characterized in that, on a glow discharge spectrometer (GDS) graph of the hot-dip galvanized steel sheet comprising, in the following order, a base steel sheet, a coating layer of a metal having a level of Gibbs free energy equal to that of Fe or above and an oxide of the metal, and a hot-dip galvanized layer, a peak of the metal is disposed closer to the hot-dip galvanized layer than a peak of oxygen, wherein the metal is one or more selected from the group consisting of Ni, Co, Cu, Sn, and Sb, and wherein a content of oxygen at the peak of oxygen is in a range of 0.05 wt. % to 1 wt. %.

2. The hot-dip galvanized steel sheet of claim 1, wherein the steel sheet includes one or more selected from the group consisting of Si, Mn, and Al in a total amount of 0.2 wt. % or above, and further includes one or more selected from the group consisting of Ti, B, and Cr in a total amount of 0.01 wt. % or above.

* * * * *